United States Patent
Hermanson

[15] 3,659,369
[45] May 2, 1972

[54] FISH POLE HOLDER

[72] Inventor: Everet T. Hermanson, 2318 Mannheim Rd., Melrose Park, Ill. 60164

[22] Filed: Dec. 17, 1969

[21] Appl. No.: 885,903

[52] U.S. Cl. ............................43/21.2, 43/54.5 R, 43/55, 248/42, 248/201
[51] Int. Cl. ..........................................A01k 97/10
[58] Field of Search .............43/21.2, 54.5, 55, 56; 248/42, 248/201, 226 A; 220/85 D

[56] References Cited

UNITED STATES PATENTS

| 3,543,432 | 12/1970 | Gates | 43/54.5 |
| 2,773,603 | 12/1956 | Gronek | 43/54.5 X |
| 2,302,300 | 11/1942 | Davies | 248/201 UX |
| 2,555,073 | 5/1951 | Zdankoski | 43/55 |

Primary Examiner—Samuel Koren
Assistant Examiner—Daniel J. Leach
Attorney—Olson, Trexler, Wolters & Bushnell

[57] ABSTRACT

A device for supporting a fishing rod in an inclined position alongside a container such as a minnow container or the like. The device comprises a frame engaging the container wall and a pair of bracket arms secured to and extending outwardly from the frame providing support means for the rod. The bracket arms are laterally spaced from each other and include a lower support member for accommodating the portion of the rod rearwardly of the reel and an upper support member for accommodating the portion of the rod forwardly of the reel.

8 Claims, 5 Drawing Figures

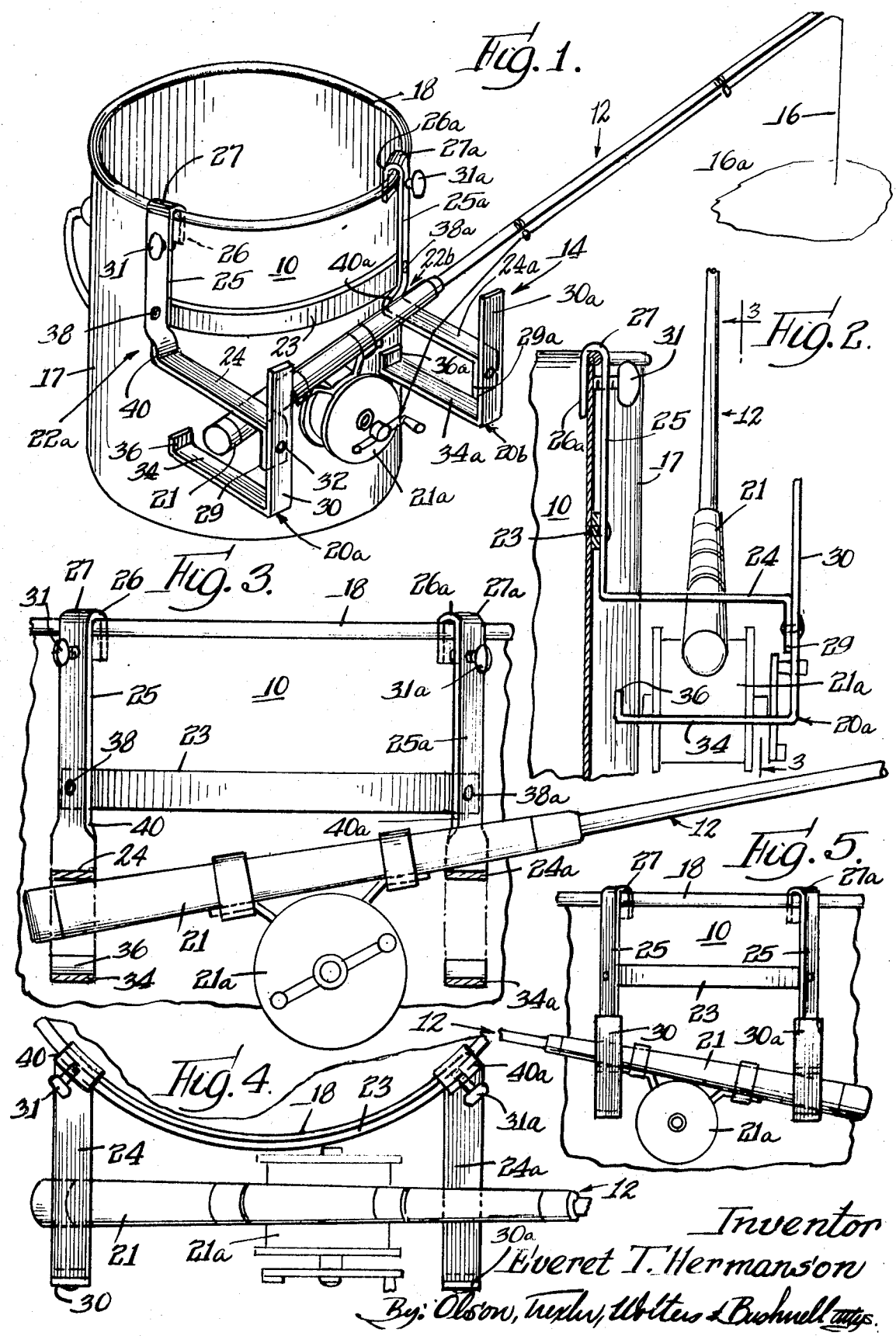

FISH POLE HOLDER

DISTINCTION OVER PRIOR ART AND OBJECTS

The lay fisherman, as well as the avid fishing enthusiast, has found that, while fishing, he must be relieved of holding the fishing rod so that he may give his arm a rest or perform other duties that might arise. While this must be done, most fishermen do not wish to give up valuable fishing time during such periods. Hence, under such circumstances it has been common practice to place the rod either upon the bank or to secure the rod handle in a crevice, as between two rocks. This is not only inconvenient, but in some cases provides inadequate support for the fishing rod.

Accordingly, an object of the present invention is to provide a novel and very practical device for holding a fish rod to a container such as a minnow container or bucket.

A more particular object of the present invention is to provide a rod holding device capable of supporting a fishing rod on a container as set forth above which is such that the rod will extend in a given direction regardless of the position of the minnow bucket, that is to say, regardless of the location of the bucket on the left or right of the user.

Additional objects and features of the invention pertain to the particular structure and arrangement whereby the above objects are obtained.

The invention, both to its structure and mode of operation, will be better understood by reference to the following disclosure and drawings forming a part thereof, wherein:

FIG. 1 is a perspective view of the fishing rod holder attached to a minnow container with a fishing rod held in a first operable position thereon;

FIG. 2 is a side elevational view of the fishing rod holder in combination with the minnow container and fishing rod as viewed from the left in FIG. 1, the minnow bucket being shown in fragmentary section;

FIG. 3 is a front sectional view of the fishing rod holder in combination with the minnow container and fishing rod taken along line 3—3 of FIG. 2;

FIG. 4 is a top view of the fishing rod holder in combination with the minnow container and fishing rod as shown in FIG. 1; and, FIG. 5 is a front sectional view of the fishing rod holder in combination with the minnow container and fishing rod taken along line 3—3 of FIG. 2 with the fishing rod held in a second operable position.

Referring now to FIG. 1, a minnow container 10 is shown with a fishing rod 12 held thereto by a fishing rod holder 14, which holder is constructed in accordance with a preferred embodiment of the invention. The rod is shown in an operable fishing position, i.e., a natural inclined fishing position, with a fishing line 16 extending into lake 16a. The fishing rod is independently supported by holder 14 so that the fisherman may rest his arm or attend to other matters while still continuing his fishing.

The minnow container 10 is a cylindrical-type container including an outer cylindrical wall portion 17 and an upper edge 18 extending around the top of cylindrical wall 17 so that the holder 14 can be attached thereto as described hereinafter. It is to be understood that the minnow container, per se, does not form a part of the invention herein disclosed and claimed and any type of container which is readily used by a fisherman is sufficient.

The holder 14 comprises two laterally spaced lower rod support members 20a and 20b, each of which respectively aids in the support of fishing rod 12 when the rod is in a first and second position described below. The rod 12, in a first position, extends upward to the right, as viewed in FIG. 1, so that lower rod support member 20a supports the portion of the fishing rod handle 21 positioned rearwardly of fishing reel 21a. The fishing rod holder is also capable of holding the fishing rod in a second position such that the rod 12 extends upward to the left, as viewed in FIG. 5, so that the end of rod handle 21 is supported by lower rod support member 20b rather than 20a.

Returning to FIG. 1, two upper support members 22a and 22b are respectively connected to lower rod support members 20a and 20b by means described below and are attached to the minnow container 10 at the edge 18 in a manner described hereinafter. The upper support member 22b aids in supporting the rod 12 at a point on rod handle 21 forwardly of fishing reel 21a, as viewed in FIG. 1, when the fishing rod is in its first position as described above. When the rod is held in its second position, as shown in FIG. 5, the upper support member 22a co-operates with lower support member 20b in the same manner as described with respect to lower support member 20a and upper support member 22b of position one so that the fishing rod extends upwardly to the left as viewed in FIG. 5. A connecting member 23 connects upper support members 22a and 22b while additionally acting as a fulcrum for holding the fishing rod holder 14 against outer wall 17 of the minnow container.

Turning to FIG. 2, the upper support member 22a is "L-shaped" having a horizontal portion 24 which extends out from the minnow container 10 when the holder 14 is attached thereto and a vertical portion 25 which extends up from one end of horizontal portion 24 and adjacent the cylindrical wall 17 of container 10. The free end of vertical portion 25 is integrally connected to a downward-extending flange 26 by a bight 27 so as to hook over the edge 18 of container 10 for affixing the support member thereto. The support member 22a can be rigidly secured to the container 10 by a set screw 31 which co-operates with a threaded bore through vertical portion 25 and is screwed therethrough so as to press against wall portion 17. A flange 29 integrally connected to the free end of horizontal portion 24 extends downward and perpendicular to the horizontal portion so as to form a bracket for contiguously connecting the lower support member 20a thereto as described below.

The lower support member 20a is also "L-shaped" and has a vertical portion 30 which is contiguously connected to flange 29 by a nut and screw assembly 32. The vertical portion 30 extends vertically above and vertically below horizontal portion 24 of the upper support member 22a and prevents the fishing rod 12 from sliding off the upper support member 22a when the fishing rod is in the above described second position. The lower support member 20a further includes a horizontal portion 34 with a vertically extending flange 36 integrally connected to its free end. As seen in FIG. 2, the horizontal portion 34 extends inwardly toward the container 10 and below the horizontal portion 24 of upper support member 22a for supporting the fishing rod 12 in a first position as described above while the vertically extending flange 36 prevents the fishing rod handle 21 from sliding off lower support member 20a.

The lower support member 20b and upper support member 22b are structurally equivalent to described lower and upper support members 20a and 22a, respectively, with an exception discussed hereinafter. Therefore, the individual components of support members 20b and 22b are designated with numerals identical to those of support members 20a and 22a with the additional suffix "a." A detailed discussion of support members 20b and 22b is omitted and reference should be made to the above description of support members 20a and 22a. The upper support member 22b is attached to the edge 18 of the container 10 in the same manner as member 22a and a sufficient distance from upper support member 22a so that the fishing rod holder 14 may provide adequate support for the fishing rod 12, as seen in FIG. 1, FIG. 3 and FIG. 5.

The connecting member 23 is connected at one end to the vertical portion 25 of upper support member 22a by a screw 38 while its otherwise free end is connected in the same manner to vertical portion 25a of upper support member 22b by screw 38a. As seen in FIG. 4, the connecting member 23 is arcuate in shape having a radius of curvature equal to the radius of curvature of the wall portion 17 of container 10 and fits contiguously against wall portion 17.

It also can be seen in FIG. 4 that horizontal portions 24 and 24a of upper support members 22a and 22b, respectively, are laterally spaced and parallel to each other. This parallel relationship is brought about by bending each of the horizontal portions 24 and 24a towards each other from a position radially outward from wall portion 17. The bent portions of the upper support members are indicated at 40 and 40a, respectively, and form the only structural difference therein.

Turning to FIG. 3, it can be seen that the rod 12 may be supported in the first position by inserting the free end of rod handle 21 between the horizontal portion 34 of lower support member 20a and horizontal portion 24 of upper support member 22a so that the free end of handle 21, which is rearwardly of reel 21a, rests against the underside of horizontal portion 24 while the other end thereof, forwardly of reel 21a, rests on the horizontal portion 24a of upper support member 22b. It is to be assumed that the line 16 of rod 12 is maintained in the lake or other such fishing spot 16a which is located to the right of minnow container 10 as viewed in FIG. 1 and which, if shown, would be located to the right of the container as viewed in FIG. 3.

The above discussion, with reference to FIG. 3, is a description of a first position assuming the container 10 is, for example, to the left of a fisherman while the fisherman is facing the lake 16a. If the fisherman would rather have the minnow container 10 to his right while facing the lake such that the line 16 would still be positioned within the lake, this could be done by rotating the minnow container 180° about its longitudinal axis and repositioning the fishing rod in rod holder 14 in its second position as seen in FIG. 5. This second position is similar to the first position described above except that the horizontal portion 34a of lower support member 20b functionally replaces horizontal portion 34 of lower support member 20a and horizontal portion 24 of upper support member 22a functionally replaces horizontal portion 24a of upper support member 22b.

Whether the fishing rod 12 is held to the minnow container in the above described first or second position depends upon whether the fisherman feels more comfortable with the minnow container to his left or to his right but in either case the fishing rod holder 14, as described above, allows the rod to be positioned so that line 16 may remain in the lake.

While a particular embodiment of the invention has been shown, it should be understood, of course, that the invention is not limited thereto since many modifications may be made; and it is, therefore, contemplated to cover by the appended claims any such modifications that fall within the true spirit and scope of the invention.

What is claimed is:

1. A device for supporting a fishing rod in an operable position on the outer wall of a container, as for example a bucket, including frame means, means for supporting said frame means on the outer wall of said container, bracket means carried by said frame means for accommodating the hand gripping extremity of a fishing rod, said bracket means including a lower support member for accommodating the portion of a fishing rod positioned rearwardly of the normal fishing reel supporting section of a rod, and an upper laterally spaced support member for accommodating the portion of a fishing rod positioned forwardly of said reel supporting section (.) said upper and lower support members being so disposed as to support a fishing rod in a position externally of and substantially tangential with respect to a wall of said container.

2. A device for supporting a fishing rod according to claim 1 wherein said upper and lower support members are substantially L-shaped each having a respective vertical portion and a respective horizontal portion whereby said hand gripping extremity is supported by said horizontal portions.

3. A device for supporting a fishing rod according to claim 2 wherein said means for supporting said frame means includes hook means co-operating with an upper edge of said outer wall whereby said frame means is supported adjacent the outer wall of said container by said hook means.

4. A device for supporting a fishing rod in an operable position on the outer wall of a container, as for example a bucket, including frame means, means for supporting said frame means on the outer wall of said container, bracket means carried by said frame means for accommodating the hand gripping extremity of a fishing rod, said bracket means including a lower support member for accommodating the portion of a fishing rod positioned rearwardly of the normal fishing reel supporting section of a rod, and an upper laterally spaced support member for accommodating the portion of a fishing rod positioned forwardly of said reel supporting section, said means for supporting said frame means further including means for rigidly holding said frame means adjacent said outer wall.

5. A device for supporting a fishing rod in an operable position on the outer wall of a container, as for example a bucket, including frame means, means for supporting said frame means on the outer wall of said container, bracket means carried by said frame means for accommodating the hand gripping extremity of a fishing rod, said bracket means including a lower support member for accommodating the portion of a fishing rod positioned rearwardly of the normal fishing reel supporting section of a rod, an upper laterally spaced support member for accommodating the portion of a fishing rod positioned forwardly of said reel supporting section, a second lower support member for accommodating the portion of a fishing rod positioned rearwardly of the normal fishing reel supporting section of a rod, said second lower support member positioned directly below said upper support member, and a second upper support member for accommodating the portions of a fishing rod positioned forwardly of said reel supporting section, said second upper support member positioned directly above said lower support member whereby said 6. A device for supporting a fishing rod according to claim 5 wherein all of said support members are substantially L-shaped having respective vertical and horizontal portions, the horizontal portions of said lower and upper support members supporting said fishing rod in said operable position and the horizontal portions of said second lower and upper support member supporting said fishing rod in said second operable position.

7. A device for supporting a fishing rod according to claim 6 wherein said means for supporting said frame means includes hook means co-operating with an upper edge of said outer wall whereby said frame means is supported adjacent the outer wall of said container by said hook means.

8. A device for supporting a fishing rod according to claim 7 wherein said means for supporting said frame means further includes means for rigidly holding said frame means adjacent said outer wall.

* * * * *